US012633100B2

(12) United States Patent　　　(10) Patent No.:　US 12,633,100 B2
Lee　　　　　　　　　　　　　　　　(45) Date of Patent:　May 19, 2026

(54) SENSOR FUSION SYSTEM AND SENSING METHOD FOR CONSTRUCTION EQUIPMENT

(71) Applicant: Hyundai Doosan Infracore Co., Ltd., Incheon (KR)

(72) Inventor: Heejin Lee, Incheon (KR)

(73) Assignee: HYUNDAI DOOSAN INFRACORE CO., LTD., Incheon (KR)

( * ) Notice: Subject to any disclaimer, the term of this patent is extended or adjusted under 35 U.S.C. 154(b) by 206 days.

(21) Appl. No.: 18/286,312

(22) PCT Filed: Mar. 21, 2022

(86) PCT No.: PCT/KR2022/003892
§ 371 (c)(1),
(2) Date: Oct. 10, 2023

(87) PCT Pub. No.: WO2022/215898
PCT Pub. Date: Oct. 13, 2022

(65) Prior Publication Data
US 2024/0331369 A1　　Oct. 3, 2024

(30) Foreign Application Priority Data
Apr. 9, 2021　(KR) ........................ 10-2021-0046624

(51) Int. Cl.
*G06V 10/80*　　(2022.01)
*E02F 9/26*　　(2006.01)
(Continued)

(52) U.S. Cl.
CPC ............ *G06V 10/803* (2022.01); *G01S 17/86* (2020.01); *G06T 7/593* (2017.01); *G06V 10/25* (2022.01);
(Continued)

(58) Field of Classification Search
CPC ...... G06V 10/803; G06V 10/25; G06V 10/10; G06V 20/58; G01S 17/86; G06T 7/593; E02F 9/261
See application file for complete search history.

(56) References Cited

U.S. PATENT DOCUMENTS

2019/0026914 A1　1/2019　Hageman et al.
2020/0041649 A1　2/2020　Green et al.
(Continued)

FOREIGN PATENT DOCUMENTS

KR　10-2014-0078860 A　6/2014
KR　10-2018-0091150 A　8/2018
(Continued)

OTHER PUBLICATIONS

International Search Report issued on Jul. 13, 2022, for corresponding International Patent Application No. PCT/KR2022/003892, along with an English translation (7 pages).
(Continued)

*Primary Examiner* — Casey L Kretzer
(74) *Attorney, Agent, or Firm* — Hauptman Ham, LLP

(57) ABSTRACT

Various embodiments of the present disclosure relate to a sensor fusion system, a sensing method using the sensor fusion system, and a construction machine having the sensor fusion system, and the sensor fusion system may include a stereo camera having two lenses and configured to generate image data and a first point cloud data by capturing a three-dimensional image; two lidar sensors, each of which configured to generate a second point cloud data and a third cloud point data, respectively; and a sensing fusion unit configured to detect a point cloud data and object information with respect to surroundings based on the image data, the first point cloud data, the second point cloud data, and the third point cloud data which have been obtained from the stereo camera and the two lidar sensors.

14 Claims, 6 Drawing Sheets

(51) Int. Cl.

| | |
|---|---|
| *G01S 17/86* | (2020.01) |
| *G06T 7/593* | (2017.01) |
| *G06V 10/12* | (2022.01) |
| *G06V 10/25* | (2022.01) |
| *G06V 20/58* | (2022.01) |

(52) U.S. Cl.
CPC .............. *G06V 20/58* (2022.01); *E02F 9/261* (2013.01); *G06V 10/12* (2022.01)

(56) References Cited

U.S. PATENT DOCUMENTS

| | | | | |
|---|---|---|---|---|
| 2020/0158869 | A1 | 5/2020 | Amirloo Abolfathi et al. | |
| 2020/0307642 | A1* | 10/2020 | Tsuji .................... | B60W 10/04 |
| 2021/0276428 | A1 | 9/2021 | Feuchtner | |
| 2023/0110730 | A1* | 4/2023 | Chen .................... | G08G 1/166 |
| | | | | 382/104 |

FOREIGN PATENT DOCUMENTS

| | | | |
|---|---|---|---|
| KR | 10-2019-0049871 | A | 5/2019 |
| KR | 10-2020-0093414 | A | 8/2020 |
| KR | 10-2145557 | B1 | 8/2020 |
| WO | 2015/098545 | A1 | 7/2015 |
| WO | 2022/015086 | A1 | 1/2022 |

OTHER PUBLICATIONS

Written Opinion issued on Jul. 13, 2022, for corresponding International Patent Application No. PCT/KR2022/003892 (5 pages).
Extended European Search Report issued Nov. 17, 2025, for corresponding European Application No. 23770998.5, 8 pages.
Office Action issued on Oct. 29, 2025, for corresponding Korean Patent Application No. 10-2024-7028934, with its English translation, 11 pages.
Office Action dated Dec. 19, 2025, for the corresponding Korean Patent Application No. 10-2021-0046624, along with an English machine translation (12 pages).

* cited by examiner

FIG. 6

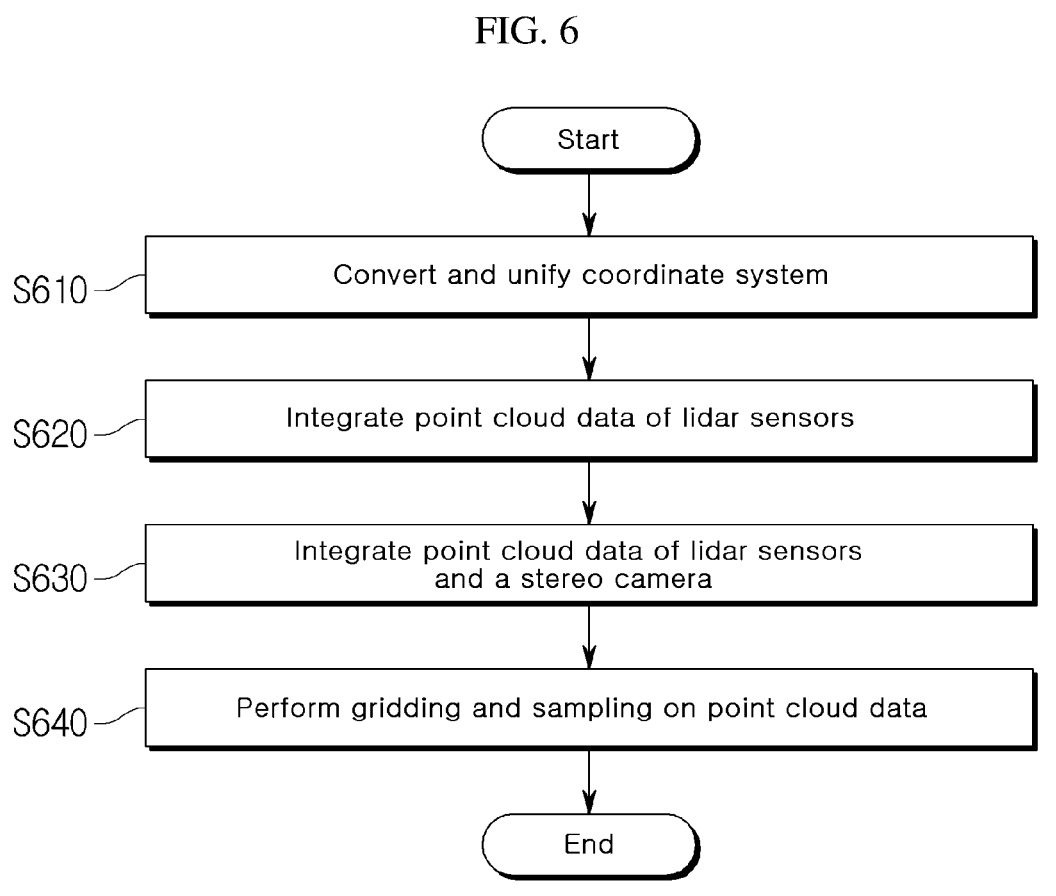

Start

S610 — Convert and unify coordinate system

S620 — Integrate point cloud data of lidar sensors

S630 — Integrate point cloud data of lidar sensors and a stereo camera

S640 — Perform gridding and sampling on point cloud data

End (a)

(b)

(c)

SENSOR FUSION SYSTEM AND SENSING METHOD FOR CONSTRUCTION EQUIPMENT

CROSS REFERENCE TO RELATED APPLICATION

The present application is a national stage filing under 35 U.S.C § 371 of PCT application number PCT/KR2022/003892 filed on Mar. 21, 2022, which is based upon and claims the benefit of priority to Korean Patent Application No. 10-2021-0046624, filed on Apr. 9, 2021, in the Korean Intellectual Property Office. All of the aforementioned applications are incorporated herein by reference in their entireties.

TECHNICAL FIELD

Various embodiments of the present disclosure relate to a sensor fusion system for using in a construction machine, a sensing method using the sensor fusion system, and a construction machine having the sensor fusion system.

BACKGROUND

An excavator is an equipment mainly used for excavating soil and may perform various works such as soil loading, a building foundation work, residential land development, and cargo loading. In addition, a wheel loader may perform works including carrying soil, sand, aggregate, and the like in a civil engineering work site, or a mine. A construction machine such as the excavator or the wheel loader is generally operated by an operator. However, recently, thanks to advancement of control and sensing technologies, the research and development of construction machines capable of the autonomous operation without the operator is underway.

In order that the autonomous operation of a construction machine, for example, the excavator, is made possible, it is necessary to perform sensing to obtain information on a surrounding work environment, a work space, and an object, such as detecting terrain in a forward direction, a shape of loads inside a bucket, a location of a dump bed of a dump truck, a shape of loads of the dump bed, and obstacles placed in a forward direction. The construction machine may perform such sensing by using a plurality of sensors provided therein, however, the conventional sensor is operated on a single sensor basis, and there may occur a situation where the sensor becomes impossible to operate, or becomes unable to provide wanted information under a certain circumstance. For example, when thinking of a camera-based sensor, the camera-based sensor may perform at least a feature of detecting an obstacle, however, it cannot detect three-dimensional data. Therefore, the camera-based sensor has a problem that it cannot provide sensing feature that is sufficient to support autonomous operation of the construction machine because the sensor cannot obtain terrain data.

DISCLOSURE

Technical Problem

The present disclosure aims to provide a sensor fusion system having a plurality of sensors combined and capable of recognizing a surrounding environment in order to solve the above-mentioned problem.

The technical problem to be achieved by the present disclosure is not limited to the above-mentioned technical problem, and other technical problems that are not mentioned will be clearly understood by ordinary-skilled persons in the art to which the present disclosure pertains from the following description.

Technical Solution

According to various embodiments of the present disclosure, one embodiment is a sensor fusion system, including: a stereo camera having two lenses and configured to generate an image data and a first point cloud data by capturing a three-dimensional image; two lidar sensors, each of which configured to generate a second point cloud data and a third cloud point data, respectively; and a sensing fusion unit configured to detect a point cloud data and object information with respect to surroundings based on the image data, the first point cloud data, the second point cloud data, and the third point cloud data which have been obtained from the stereo camera and the two lidar sensors.

According to various embodiments of the present disclosure, another embodiment is a sensing method for detecting an object and generating a point cloud data with respect to a measurement region of a sensor fusion system having a stereo camera outputting an image data and a first point cloud data, and two lidar sensors outputting a second point cloud data and a third point cloud data, including: obtaining the image data, the first point cloud data, the second point cloud data, and the third point cloud data; obtaining a sixth point cloud data with respect to the measurement region based on the first point cloud data, the second point cloud data, and the third point cloud data; preprocessing the image data; detecting and classifying an object from the preprocessed image data; and obtaining a location coordinate and distance information of the detected object by using the sixth point cloud data.

Advantageous Effect

The sensor fusion system provided in the construction machine according to the embodiments of the present disclosure may make autonomous operation and obstacle detection possible at the same time, and may dramatically improve the resolution during terrain detection.

The construction machine according to the embodiments of the present disclosure has a sensor fusion system that dramatically increases cognition abilities on the surrounding environment, and accordingly, improved accuracy of the autonomous operation and improved operation efficiency may be expected.

The construction machine according to the embodiments of the present disclosure may precisely figure out distances to obstacles based on the sensor fusion system, thereby active safety response can be made possible.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

FIG. 6 is a flowchart illustrating PCD data synthetization of a sensing fusion unit according to various embodiments of the present disclosure.

MODE FOR INVENTION

Figure 1:
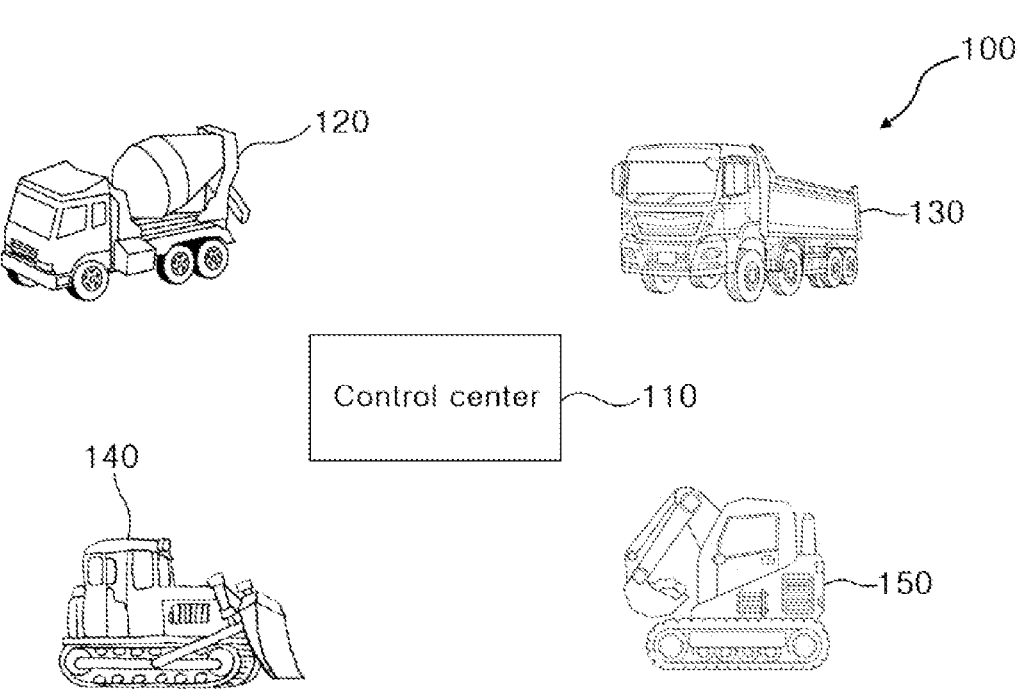
FIG. 1 is a view illustrating an autonomous working system according to various embodiments of the present disclosure.

The features, advantages, and method for accomplishment of the present invention will be more apparent from referring to the following detailed embodiments described as well as the accompanying drawings. However, the present invention is not limited to the embodiment to be disclosed below and is implemented in different and various forms. The embodiments bring about the complete disclosure of the present invention and are provided to make those skilled in the art fully understand the scope of the present invention. The present invention is just defined by the scope of the appended claims. The same reference numerals throughout the disclosure correspond to the same elements.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts, or any combination thereof which are mentioned in the specification, and intended not to exclude the existence or addition of at least one another characteristics, numbers, steps, operations, components, parts, or any combination thereof.

While terms such as the first and the second, etc., can be used to describe various components, the components are not limited by the terms mentioned above. The terms are used only for distinguishing between one component and other components.

Therefore, the first component to be described below may be the second component within the spirit of the present invention. Unless differently defined, all terms used herein including technical and scientific terms have the same meaning as commonly understood by one of ordinary skill in the art to which the present invention belongs. Also, commonly used terms defined in the dictionary should not be ideally or excessively construed as long as the terms are not clearly and specifically defined in the present application.

A term "part" or "module" used in the embodiments may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments of the present invention may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC).

FIG. 1 is a view illustrating an autonomous working system 100 according to various embodiments of the present disclosure.

Referring to FIG. 1, the autonomous working system 100 according to various embodiments may include a control center 110 and at least one construction machine (or autonomous working construction machine) 120 to 150.

According to various embodiments, the construction machines 120 to 150 refer to machines that perform work at civil engineering sites or construction sites, and may include, as shown in FIG. 1, a mixer truck 120, a dump truck 130, a dozer 140, and an excavator 150. However, this is only illustrative, and the construction machine may include various machines such as a drilling machine, a crane, a wheel loader, a scraper, and the like.

According to the embodiment, an operator may perform work with the construction machines 120 to 150 in accordance with work instructions received from the control center 110. According to another embodiment, the construction machines 120 to 150 may autonomously perform work without the operator. The work instruction may include information related to a work area in which the construction machine has to perform the work, the work to be performed in the work area, and the like. For example, in accordance with the work instruction, the construction machines 120 to 150 may move to the work area without a user's operation or based on the user's operation and perform work.

The construction machines 120 to 150 may be provided with various sensors. Based on information obtained by the sensors, the construction machines 120 to 150 may sense the state of the construction machine and/or the surrounding environment of the construction machine, and may consider a result of the sensing in performing the work.

According to various embodiments, the control center 110 may be a system that manages the at least one construction machine 120 to 150 which is input to the work site. According to the embodiment, the control center 110 may give work instructions to the at least one construction machine 120 to 150. For example, the control center 110 may generate a work instruction defining a work area and a work to be performed in the work area, and may transmit them to the at least one construction machine 120 to 150.

Figure 2:
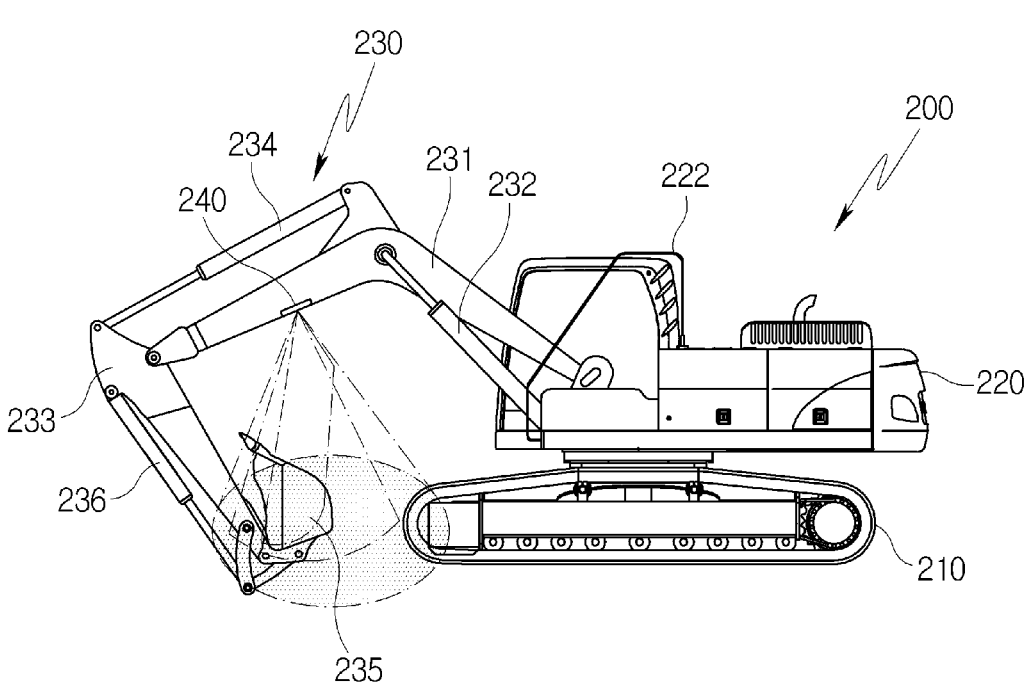
FIG. 2 is a view illustrating an excavator having a sensor fusion system according to various embodiments of the present disclosure.

FIG. 2 is a view illustrating an excavator 200 having a sensor fusion system according to various embodiments of the present disclosure. In the following description, the excavator 200 is described as an example of a construction machine, but is not limited to the excavator. In addition, the excavator described with reference to FIG. 2 may be the excavator 150 illustrated in FIG. 1.

Referring to FIG. 2, the excavator 200 includes a moving lower body 210, an upper body 220 which is mounted on the lower body 210 and rotates 360 degrees, and a front work part 230 coupled to the front of the upper body 220. However, this is only an example, and the embodiment of the present disclosure is not limited thereto. For example, in addition to the components of the excavator 200 described above, one or more other components (e.g., a plate coupled to the rear of the lower body 210) may be added.

According to various embodiments, the upper body 220 may include an operation cab 222 in which an operator boards and operates and may include an internal space (not shown) where a power generator (e.g., an engine) can be mounted. The operation cab 222 may be provided on a portion close to the work area. The work area is a space in which the excavator 200 works. The work area is located in front of the excavator 200. For example, the on-board operator may perform work under the obtained visual field, and the operation cab 222 may be, as shown in FIG. 2, close to the work area and be located at a position biased to one side of the upper body 220, in consideration of the position where the front work part 230 is mounted.

According to various embodiments, the front work part 230 may be mounted on the top surface of the upper body 220 and may perform work such as land excavation, transportation of a heavy object, etc. According to the embodiment, the front work part 230 may include a boom 231 rotatably coupled to the upper body 220, a boom cylinder 232 which rotates the boom 231, an arm 233 rotatably coupled to the front end of the boom 231, an arm cylinder 234 which rotates the arm 233, a bucket 235 rotatably coupled to the front end of the arm 233, and a bucket cylinder 236 which rotates the bucket 235. During the operation of the excavator 200, one end of the boom 231, one end of the arm 233, and one end of the bucket 235 perform a rotational motion individually to maximize an area that the bucket 235 can reach. Since the aforementioned front work part 230 has been publicly known in many documents, the detailed description thereof will be omitted.

According to various embodiments, the lower body 210 may be coupled to the bottom surface of the upper body 220. The lower body 210 may include a carriage formed in a wheel type using wheels or in a crawler type using a caterpillar. The carriage may implement forward, backward, right, and left movements of the excavator 200 by using the power generated by the power generator as a driving force. According to the embodiment, the lower body 210 and the upper body 220 may be rotatably coupled by a center joint.

According to various embodiments, the excavator 200 may include a sensor fusion system for collecting information related to the state of the excavator 200 and/or information related to the surrounding environment. In an example of FIG. 2, a sensing device 240 of the sensor fusion system is illustrated as being provided in the boom 231 of the excavator 200, however, this is only an example, and the sensing device 240 of the sensor fusion system may be provided in various locations of the excavator 200 depending on a purpose of use and the surrounding environment intended to measure. According to the embodiment, the sensing device 240 of the sensor fusion system may be installed in a location that is most advantageous for measuring the dump bed of the truck, and a frontal side and the bucket of the excavator or wheel loader. For example, in case of the excavator, the sensing device 240 of the sensor fusion system may be installed on a side surface of a lower end of the boom 231, or on an upper end of the operation cab 222.

The example illustrated in FIG. 2 described the excavator having the sensor fusion system, however, the sensor fusion system may be provided in any construction machine.

According to various embodiments, the sensor fusion system may serve to perform front recognition of the construction machine (e.g., excavator), and thus, may make automation/autonomous operation possible through front terrain detection, and may update the current terrain to the control center 110 in real time so that the current terrain can be reflected in the drawings. In addition, during a work, the sensor fusion system may detect a shape of a load contained in the bucket to figure out the current workload or work efficiency so that the information can be used for establishing or modifying work plans. Further, the sensing fusion system may make recognition as to where the dump bed is located, and detection of a shape of load contained in the dump bed possible so that the autonomous loading can be performed. Moreover, based on image information of the camera, the sensing fusion system may implement detection of an obstacle, classification of kinds of the obstacle, and may implement active safety features such as an automatic stop and avoidance based on the sensor fusion information, by figuring out a precise distance to the obstacle.

Figure 3:
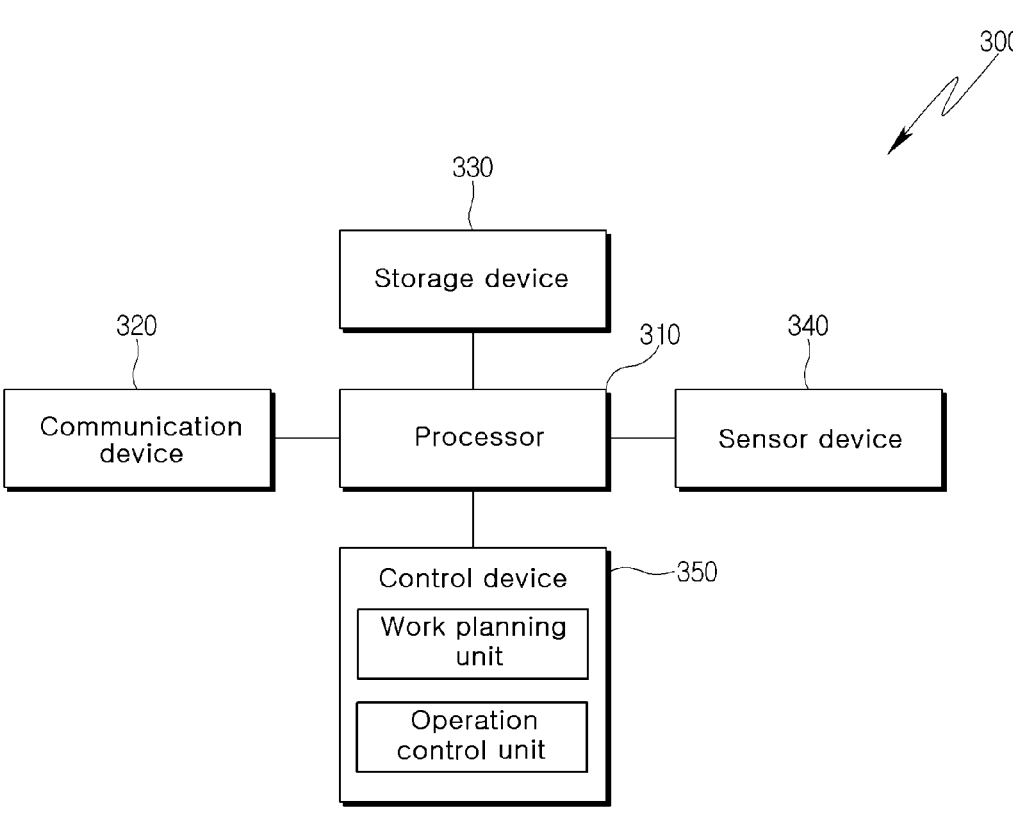
FIG. 3 is a diagram conceptually illustrating a construction machine according to various embodiments of the present disclosure.

FIG. 3 is a diagram conceptually illustrating the construction machine 300 according to various embodiments of the present disclosure.

Referring to FIG. 3, the construction machine 300 may include a processor 310, a communication device 320, a storage device 330, a sensor device 340, and a control device 350. However, this is only an example, and the embodiment of the present disclosure is not limited thereto. For example, at least one of the above-described components of the construction machine 300 may be omitted or one or more other components (e.g., input device, output device) may be added to the configuration of the construction machine 300.

According to various embodiments, the processor 310 may be configured to control the overall operation of the construction machine 300. According to the embodiment, the processor 310 executes software (e.g., a program) stored in the storage device 330, thereby controlling at least one of the components connected to the processor 310 (e.g., the communication device 320, the storage device 330, the sensor device 340, or the control device 350). The processor 310 may perform various data processing or operations. For example, as at least a part of data processing or operation, the processor 310 may store instructions or data received from other components in the storage device 330, process the instructions or data stored in the storage device 330, and store the result data in the storage device 330. The processor 310 may include a main processor and an auxiliary processor which can be operated independently of or together with the main processor. According to the embodiment, the processor 310 may perform a controller area network (CAN) communication with the aforementioned components (e.g., the communication device 320, the storage device 330, the sensor device 340, or the control device 350), and the present disclosure is not limited thereto.

According to various embodiments, the communication device 320 may transmit/receive data to and from an external device by using a wireless communication technology. The external device may include a control center 110, and other construction machines 120 to 150. For example, the communication device 320 may receive work instructions from an external device, and transmit data related to the work (e.g., result of the work) to the external device. Here, communication technologies used by the communication device 320 include global system for mobile communication (GSM), code division multi access (CDMA), long term evolution (LTE), 5G, wireless LAN (WLAN), wireless-fidelity (Wi-Fi), Bluetooth, radio frequency identification (RFID), infrared data association (IrDA), ZigBee, near field communication (NFC), and the like. Also, the communication device 320 may include at least one positioning device capable of recognizing a location of the construction machine 300.

According to various embodiments, the storage device 330 may store a variety of data used by at least one component of the construction machine 300 (e.g., the processor 310, the communication device 320, the sensor device 340, or the control device 350). According to the embodiment, the storage device 330 may store specifications (e.g., a model name, a serial number, and basic specifications) of the construction machine 300, map data, and the like. For example, the storage device 330 may include at least one of a non-volatile memory device and a volatile memory device.

According to various embodiments, the sensor device 340 may collect information related to at least one among a state of the construction machine 300, a work area of the construction machine 300, or obstacles around the construction machine 300 by using various sensors. The sensor device 340 may include the sensor fusion system which will be described in detail below.

According to various embodiments, the control device 350 may control works of the construction machine 300. For example, the control device 350 may include a work planning unit 352 and an operation control unit 354.

According to various embodiments, the control device 350 may receive work instructions from the control center 110 and/or the construction machine 300.

According to the embodiment, the work instruction may include information related to a work area, kinds of work (work content) to be performed in the work area, and the like. The kinds of work may include digging, trenching, grading, breaking, dumping for loading the excavated soil, swinging for rotating the upper body 220, moving for changing a location of the construction machine 300, and the like, which can be performed by the construction machine 300. In addition, the work area is a part of the work site, and may be an area where at least one work should be performed. (e.g., digging, grading etc.) In addition, the work instruction may include a moving path for guiding the construction machine 300 on stand-by located away from the site to the work site. In this case, the construction machine 300 may depart from the standby site to travel to the work site based on the moving path.

In addition, as a part of a work plan, the control device 350 (or work planning unit 352) may decide an order for processing a work that the construction machine 300 intends to perform in the work area. For example, when a work is instructed to be done in a plurality of work areas in the work site, the control device 350 (or work planning unit 352) may determine a work area with a first priority and a work area with a next priority. As another example, when a plurality of works are instructed to be done in one work area, the control device 350 (or work planning unit 352) may plan works to be carried out with a first priority and works to be carried out with a next priority in the work site. However, this is only illustrative, and the present disclosure is not limited thereto. For example, a part of the work plan, for example, the order for processing a work may be designated by the control center 110 and provided to the construction machine 300.

According to various embodiments, the control device 350 (or work planning unit 352) may obtain and determine a work route for processing works based on the work plan. The work route may indicate a route on which the construction machine 300 should travel to the work area (or work processing site).

According to various embodiments, the control device 350 (or operation control unit 354) may determine a motion trajectory of the construction machine 300 based on the work route. The motion trajectory may mean a motion of the construction machine 300 to travel according to the work route. According to the embodiment, the control device 350 (or operation control unit 354) may determine a midpoint close to the construction machine 300 among midpoints included in the work route as a part of the motion trajectory.

According to the various embodiments, the control device 350 (or operation control unit 354) may obtain steering information of the construction machine 300 based on the motion trajectory. The steering information may include a steering speed, a steering angle, and the like. For example, the control device 350 (or operation control unit 354) may determine a location and a direction of the construction machine 300 (e.g., lower body 210) based on at least one among sensor information obtained through the sensor device 340 (e.g., inertial sensor)(e.g., information related to a state of the construction machine 300), and information obtained through the communication device 320 (e.g., RTK GNSS module)(e.g., information related to a location and/or direction of the construction machine 300), and may obtain steering information by comparing it with a location and a direction of the determined midpoint.

According to the various embodiments, the control device 350 (or operation control unit 354) may determine control information for controlling the construction machine 300 based on the steering information. According to the embodiment, the control device 350 (or operation control unit 354) may convert the steering information into a driving control value based on a specification of the construction machine 300. For example, the control device 350 (or operation control unit 354) may convert the steering information into a speed control value and a direction control value with respect to a traveling body of the construction machine 300 based on the specification of the construction machine 300. In addition, the control device 350 (or operation control unit 354) may control left and right traveling bodies (e.g., wheel, caterpillar track) such that the construction machine 300 is driven according to the converted control value.

In the above-mentioned embodiment, it was described that the processor 310 and the control device 350 are separate from each other, however, that is merely an example, and the present disclosure is not limited thereto. For example, the control device 350 and the processor 310 may be designed as a single configuration. In addition, at least a part of the configuration of the processor 310 may be configured as a configuration of an external device.

Hereinafter, the sensor fusion system which may be a part of the sensor device 340 will be described in more detail.

Figure 4:
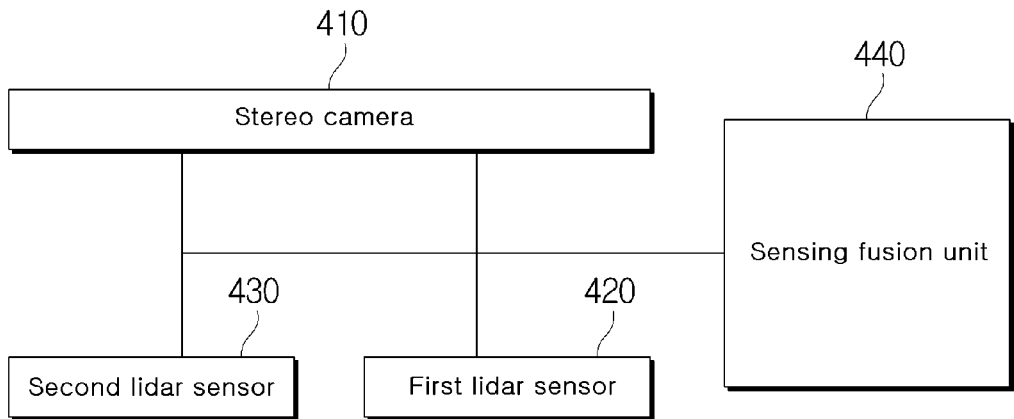
FIG. 4 is a diagram illustrating a sensor fusion system according to various embodiments of the present disclosure.

FIG. 4 is a diagram illustrating the sensor fusion system according to various embodiments of the present disclosure.

Referring to FIG. 4, the sensor fusion system may comprise a stereo camera 410 having two lenses, two lidar sensors 420 and 430, and a sensing fusion unit 440.

The stereo camera 410 is a camera which can capture a three-dimensional image, which can be seen in a three-dimension through perspective, by simulating a human eye by means of two lenses spaced apart on the left and right sides at a certain interval. It is possible to generate a point cloud data and an image data by capturing three-dimensional images.

The lidar sensor may generate a point cloud data only. The point cloud data may be a data which includes distance information to a point at which a signal has been reflected based on a time of signal return after signal transmission. That is, each point of the point cloud data may be a place where an object reflecting a signal is located, and may include distance information to the respective point.

According to the embodiment, it is possible that each lidar sensor has almost the same sensing direction as that of the stereo camera 410 by being installed below lenses of the stereo camera 410. In addition, according to the embodiment, one lidar sensor may be installed to have a sensing direction being set downward by a certain angle based on the horizontal, and the other lidar sensor may be installed to have a sensing direction being set upward by a certain angle based on the horizontal. For example, the sensing direction of one lidar sensor may be set downward by 25 degrees based on the horizontal, and the sensing direction of the other lidar sensor may be set upward by 25 degrees based on the horizontal. By doing so, measurement regions being measured by the two lidar sensors may be divided into upper and lower regions. At this instance, it is possible to adjust the upward angle and downward angles such that each measurement region being measured by the two lidar sensors partially overlaps each other. Though it is fine to leave them not to overlap each other theoretically, but it may be advantageous to install them in a way to partially overlap each other in order to remove blind spots, in fact.

The reason installing the two lidar sensors to have the sensing directions divided into the upper and lower directions is that most of the lidar sensors currently being released have a very wider horizontal measurement region that is more than 120 degrees, and a very narrow vertical measurement region that is less than 30 degrees. Since most of the commercial lidar sensor is released for the purpose to be installed in an autonomous driving vehicle, the lidar sensor may have a wider horizontal measurement region and a narrower vertical measurement region. However, in order to adjust the lidar sensor to an autonomous working environment of the construction machine, since the vertical measurement region thereof should be expanded to more than a range provided by the commercial lidar sensor currently being released, the present disclosure proposes to expand the vertical measurement region by using the two lidar sensors.

According to the embodiment, the sensing device of the sensor fusion system being comprised of the stereo camera and the two lidar sensors may be installed in a bracket, and in this case, the bracket may have an apparatus that can finely adjust angles of the stereo camera and the lidar sensors, and may adjust angles of the stereo camera and the lidar sensors according to the control of the control center 110 or the operator.

The sensing fusion unit 440 may output object detection information and a point cloud data (PCD) based on the data which are obtained from the sensing devices 410, 420 and 430 of the sensing fusion system. The sensing fusion unit 440 may be implemented with at least one processor, and may generate precise and accurate sensing data by processing the data which are obtained from the sensing devices 410, 420 and 430 through implementation of a program or an algorithm using the at least one processor. According to the embodiment, the sensing fusion unit 440 may be implemented with the processor 310 illustrated in FIG. 3, however, according to another embodiment, the sensing fusion unit 440 may be implemented with at least one separate processor which is different from the processor 310.

Figure 5:
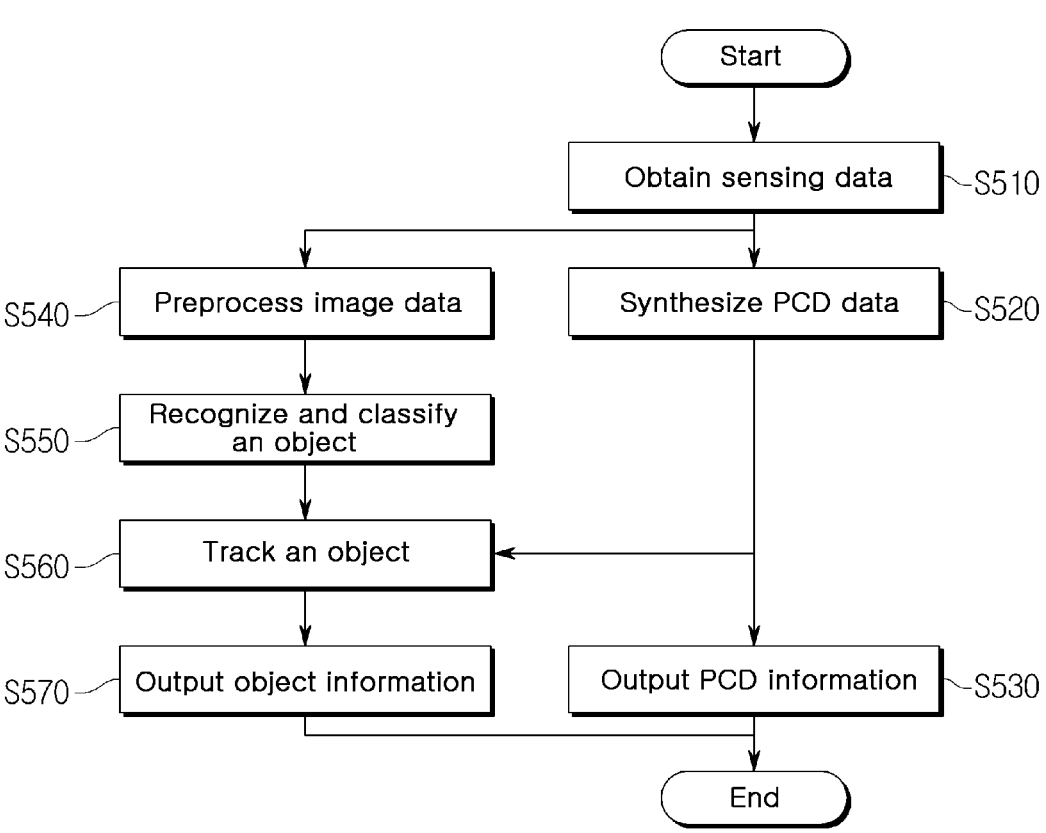
FIG. 5 is a flowchart illustrating operations of a sensing fusion unit according to various embodiments of the present disclosure.

FIG. 5 is a flowchart illustrating operations of the sensing fusion unit according to various embodiments of the present disclosure.

Referring to FIG. 5, in step of S510, the sensing fusion unit 440 may obtain a sensing data from the plurality of sensing devices 410, 420 and 430 which are to be connected thereto. According to various embodiments, the sensing fusion unit 440 may obtain a point cloud data (PCD) of each site and an image data from the stereo camera 410 of the sensor fusion system. The point cloud data may be a three-dimensional data. The sensing fusion unit 440 may temporarily store the obtained point cloud data in the storage device 330, or a separate storage device, or the at least one processor.

In addition, the sensing fusion unit 440 may obtain the point cloud data of each site from the two lidar sensors 420 and 430. The sensing fusion unit 440 may temporarily store the point cloud data which have been obtained from the two lidar sensors 420 and 430 in the storage device 330, or a separate storage device, or the at least one processor.

Thereafter, steps of processing the PCD (S520, S530) and steps of processing the image data (S540, S550, S560, S570) may be independently performed from each other, however, the steps may be performed sequentially according to the embodiment, or simultaneously according to another embodiment.

According to various embodiments, in step of S520, the sensing fusion unit 440 may synthesize PCD which have been obtained from the sensor devices. According to various embodiments, the sensing fusion unit 440 may generate a field of view (FOV) of the sensor fusion system by synthesizing PCD which have been obtained from the stereo camera 410 and the lidar sensors 420 and 430, respectively, generate a point cloud data with respect to each point of the FOV by synthesizing each point cloud data, and output the point cloud data, in step of S530.

The output point cloud data may be transmitted to the control center 110 through the communication device 320, or may be used in the operation of the construction machine 300.

FIG. 6 is a flowchart illustrating PCD data synthetization of the sensing fusion unit 440 according to various embodiments of the present disclosure. FIG. 6 may be an embodiment of the step of S520 of FIG. 5.

Referring to FIG. 6, in step S610, the sensing fusion unit 440 may convert and unify a coordinate system with respect to each point cloud data. Since the point cloud data, which have been obtained from each measurement device, is the data measured from a reference position of each device, and may each have a different coordinate system. Therefore, to synthesize point cloud data which are measured by each device, it is necessary to convert and unify the data to have the same coordinate system. According to the embodiment, it is possible to unify the coordinate systems of the data, which have been obtained from each device, by setting an origin of a coordinate system of the entire sensing fusion system, obtaining a relative coordinate of an origin of a coordinate system of each device based on the set origin, and reflecting the obtained relative coordinate to each measured value. At this instance, the origin of the coordinate system of the entire sensing fusion system may be an origin of the coordinate system being used by the construction machine 300.

According to various embodiments, in step S620, the sensing fusion unit 440 may integrate the point cloud data obtained from the two lidar sensors 420 and 430. According to the embodiment, the sensing direction of the first lidar sensor 420 may be a direction that is lifted upward by a certain angle based on a horizontal surface, and the sensing direction of the second lidar sensor 430 may be a direction that is fallen downward by a certain angle based on the horizontal surface. That is, the first lidar sensor 420 may provide point cloud data with respect to the upper measurement region, and the second lidar sensor 430 may provide point cloud data with respect to the lower measurement region. Since the data format and the scale of the point cloud data provided by the two lidar sensors 420 and 430 may be the same, in a state where the coordinate system is unified according to the step S610, it is possible to immediately obtain the point cloud data of the entire lidar sensors by combining the two lidar sensors 420 and 430.

However, since it is not guaranteed that the first lidar sensor 420 and the second lidar sensor 430 are installed without any asymmetry during the installation, a measurement region, which is finally secured as a result of integrating the point cloud data obtained from the first lidar sensor 420 and the point cloud data obtained from the second lidar sensor 430, may not have an accurate quadrangle shape. In this case, since there may be points which are not measured, the measurement region by the first lidar sensor 420 and the measurement region by the second lidar sensor 430 may be set to partially overlap each other, as described above. In this case, there may be some overlapping section when integrating the point cloud data obtained from the first lidar sensor 420 and the point cloud data obtained from the second lidar sensor 430, and the sensing fusion unit 440 may determine the point cloud data with respect to the respective section by interpolating the point cloud data of the two lidar sensors 420 and 430 in the overlapping section.

In addition, if the first lidar sensor 420 and the second lidar sensor 430 are installed with the asymmetry, the final measurement region which has been integrated may have a shape similar to a trapezoid, rather than a shape of a quadrangle. At this instance, the sensing fusion unit 440 may trim the measurement region to have the biggest rectangle shape that can be obtained in the synthesized measurement region to determine the final measurement region of the point cloud data.

According to various embodiments, in step S630, the sensing fusion unit 440 may integrate the point cloud data obtained from the stereo camera 410 and the integrated point cloud data from the lidar sensors.

Figure 7:
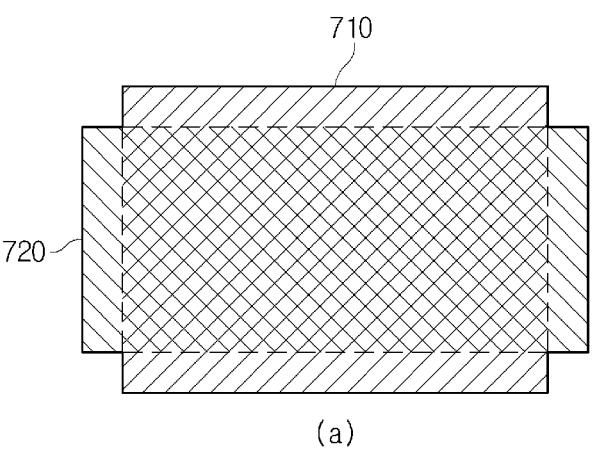
FIG. 7 is a view for explaining an example of integrating a point cloud data 710 of a stereo camera 410 and an integrated point cloud data 720 of lidar sensors.
Figure 7:
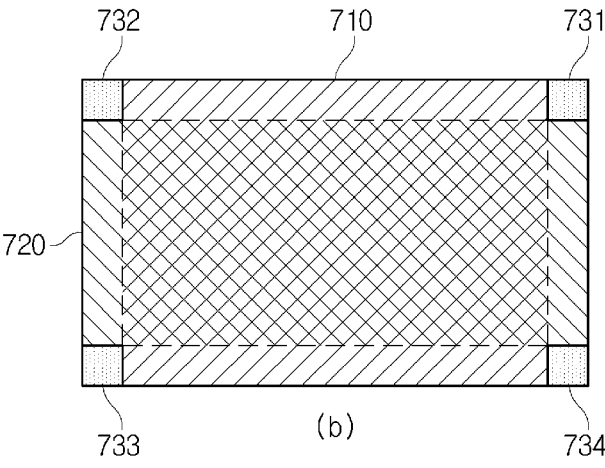
Figure 7:
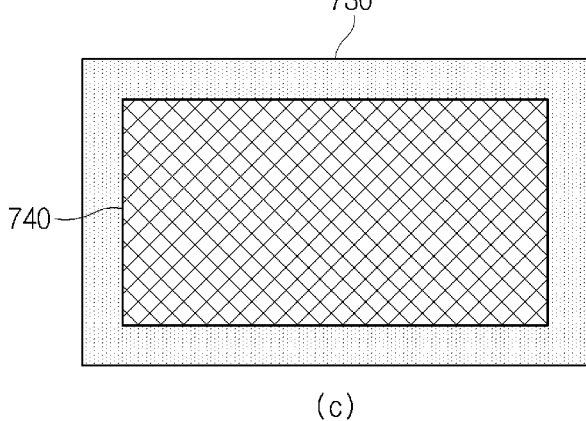

FIG. 7 is a view for explaining an example of integrating the point cloud data 710 of the stereo camera 410 and the integrated point cloud data 720 of the lidar sensors.

Referring to FIG. 7, the sensing fusion unit 440 may integrate the point cloud data by performing interpolation based on the obtained point cloud data 710 and 720 in the overlapping region 740 where the point cloud data 710 of the stereo camera 410 and the integrated point cloud data 720 of the lidar sensors overlap each other. Further, in a region with no overlap, the sensing fusion unit 440 may use one point cloud data that exists in the respective region as it is. In addition, through extrapolation of corner regions 731 to 734 having no data, the sensing fusion unit may determine the point cloud data of the respective regions by determining an estimation from a transition of the point cloud data of a periphery. According to the embodiment, the extrapolation, which is performed to estimate the point cloud data of the corner regions 731 to 734 having no data from the transition of the point cloud data in the periphery, may be performed by applying a machine learning method.

According to the embodiment, a training material for the extrapolation may be provided to train the artificial intelligence that performs the machine learning. The training material in this case may be a sample of various point cloud data which have been measured in an empty space region which occurs when the integrated point cloud data of the lidar sensors and the point cloud data of the stereo camera are integrated. The artificial intelligence may estimate and provide the point cloud data with respect to the empty space region based on the provided sample of the point cloud data. At this instance, the training data may be updated in the storage device inside the system, whenever an update is needed aperiodically.

As a result of such integration, the overlapping region 740 of the point cloud data 710 of the stereo camera 410 and the integrated point cloud data 720 of the lidar sensors may become a region which is sensed with high accuracy, and the peripheral region 730 may become a region which is sensed with low accuracy.

After that, in step S640, gridding and sampling with respect to the point cloud data may be performed. In the examples of FIG. 7, spacing and density may be different in each of the region 740 where the interpolation is applied, the regions 731 to 734 where the extrapolation is applied, and the region where only the integrated point cloud data of the lidar sensors or only the point cloud data of the stereo camera is applied. Therefore, the sensing fusion unit 440 may process the point cloud data such that all the measurement regions have the uniform spacing and density by performing gridding at an equal interval to a grid required by the construction machine over the entire measurement regions.

In addition, the sensing fusion unit 440 may perform 1/n down-sampling as needed for faster processing or real-time processing, and the point cloud data which have completed the final processing may be standardized along with time information.

Referring to FIG. 5 again, the sensing fusion unit 440 may perform preprocessing over the image data which have been obtained from the stereo camera 410. According to the embodiment, the sensing fusion unit 440 may perform preprocessing such as gamma correction, brightness correction, contrast correction, definition correction, and noise reduction.

According to various embodiments, in step S550, the sensing fusion unit 440 may recognize and classify an object from the image which has been preprocessed. According to the embodiment, the sensing fusion unit 440 may recognize and classify an object by applying a machine learning method. For the machine learning, a training data, which includes image information of obstacles such as a shape of a dump bed of the dump truck, a human being, and a vehicle expected to collide during work, may be provided. The sensing fusion unit 440 may search for an object having high consistency ratio compared with an object provided in the training data and classify it by applying the machine learning method.

According to various embodiments, in step S560, the sensing fusion unit 440 may perform tracking over a detected object. According to the embodiment, the sensing fusion unit 440 may obtain a location coordinate of an object detected in the image, and may obtain accurate distance information over the respective coordinate based on the point cloud data which have been obtained in step S520. In addition, the sensing fusion unit 440 may obtain the speed of an object by tracking movements of the respective object in a plurality of images. The sensing fusion unit 440 may obtain kinds, a location coordinate, an accurate distance, and speed information of the detected object.

According to various embodiments, in step S570, the sensing fusion unit 440 may standardize kinds, a location coordinate, an accurate distance, and additionally, speed information of the detected object along with the time information and may output them along with the image as object detection information.

The output image information and the object detection information may be transmitted to the control center 110, or displayed in a dashboard of the construction machine 300, through the communication device 320, and may be used as a basic data for control in case of an autonomously controlled construction machine.

The above description may be summarized as below.

According to various embodiments, a sensor fusion system may include: a stereo camera having two lenses and configured to generate image data and a first point cloud data by capturing a three-dimensional image: two lidar sensors, each of which configured to generate a second point cloud data and a third cloud point data, respectively; and a sensing fusion unit configured to detect a point cloud data and object information with respect to surroundings based on the image data, the first point cloud data, the second point cloud data, and the third point cloud data which have been obtained from the stereo camera and the two lidar sensors.

According to various embodiments, the stereo camera may generate the image data and the first point cloud data with respect to a first measurement region, and among the two lidar sensors, a first lidar sensor may generate a second point cloud data with respect to the second measurement region by sensing the second measurement region directed upward by a first predetermined angle based on a horizontal surface, and a second lidar sensor may generate a third point cloud data with respect to the third measurement region by sensing the third measurement region directed downward by a second predetermined angle based on the horizontal surface.

According to various embodiments, the sensing fusion unit may convert the first point cloud data, the second point cloud data, and the third point cloud data, each of which having a different coordinate system, into data of one unified coordinate system, obtain a fourth point cloud data with respect to a fourth measurement region formed by integrating the second measurement region and the third measurement region, by integrating the converted second point cloud data and the third point cloud data, obtain a fifth point cloud data with respect to a fifth measurement region including the first measurement region and the fourth measurement region by integrating the converted first point cloud data and the fourth point cloud data, and obtain a sixth point cloud data having uniform spacing and density by performing gridding at an equal interval to a grid required by a construction machine with respect to the fifth measurement region to process the fifth point cloud data.

According to various embodiments, the sensing fusion unit may obtain the fourth point cloud data by interpolating the second point cloud data and the third point cloud data in an overlapping region among the second measurement region and the third measurement region.

According to various embodiments, the sensing fusion unit may set the fifth measurement region having a rectangular shape based on the first measurement region and the fourth measurement region, obtain the fifth point cloud data with respect to an overlapping region of the fifth measurement region which overlaps the first measurement region and the fourth measurement region by interpolating the first point cloud data and the fourth point cloud data of the overlapping region, obtain the fifth point cloud data with respect to a region of the fifth measurement region which is included only to the first measurement region by using the first point cloud data of the region as it is, obtain the fifth point cloud data with respect to a region of the fifth measurement region which is included only to the fourth measurement region by using the fourth point cloud data of the region as it is, and obtain the fifth point cloud data with respect to a region of the fifth measurement region which is not included to both the first measurement region and the fourth measurement region by extrapolating the first point cloud data and the fourth point cloud data of a periphery of the region.

According to various embodiments, the extrapolation may be performed by applying a machine learning method.

According to various embodiments, the sensing fusion unit may preprocess the image data.

According to various embodiments, may detect and classify an object from the preprocessed image data, and may obtain a location coordinate and distance information with respect to the detected object by using the sixth point cloud data.

According to various embodiments, the sensing fusion unit may detect and classify an object from the image data which has been preprocessed by applying a machine learning method, and may provide image information with respect to obstacles including a dump bed shape of a dump truck, a human being, and a vehicle as training data to train an artificial intelligence performing the machine learning.

According to various embodiments, a sensing method for detecting an object and generating a point cloud data with respect to a measurement region of a sensor fusion system having a stereo camera outputting an image data and a first point cloud data, and two lidar sensors outputting a second point cloud data and a third point cloud data may include: obtaining the image data, the first point cloud data, the second point cloud data, and the third point cloud data: obtaining a sixth point cloud data with respect to the measurement region based on the first point cloud data, the second point cloud data, and the third point cloud data: preprocessing the image data: detecting and classifying an object from the preprocessed image data; and obtaining a location coordinate and distance information of the detected object by using the sixth point cloud data.

According to various embodiments, the image data and the first point cloud data may be obtained with respect to a first measurement region, the second point cloud data may be obtained by sensing, with a first lidar sensor, a second measurement region directed upward by a first predetermined angle based on a horizontal surface, and the third point cloud data may be obtained by sensing, with a second lidar sensor, a third measurement region directed downward by a second predetermined measurement region based on the horizontal surface.

According to various embodiments, the obtaining a sixth point cloud data with respect to the measurement region may include: converting the first point cloud data, the second point cloud data, and the third point cloud data, each of which having a different coordinate system, into data of one unified coordinate system: obtaining a fourth point cloud data with respect to a fourth measurement region formed by integrating the second measurement region and the third measurement region, by integrating the converted second point cloud data and the third point cloud data: obtaining a fifth point cloud data with respect to a fifth measurement region including the first measurement region and the fourth measurement region by integrating the converted first point cloud data and the fourth point cloud data; and obtaining a sixth point cloud data having uniform spacing and density by performing gridding at an equal interval to a grid required by a construction machine with respect to the fifth measurement region to process the fifth point cloud data.

According to various embodiments, the obtaining a fourth point cloud data may include: obtaining the fourth point cloud data by interpolating the second point cloud data and the third point cloud data in an overlapping region among the second measurement region and the third measurement region.

According to various embodiments, the obtaining a fifth point cloud data may include: setting the fifth measurement region having a rectangular shape based on the first measurement region and the fourth measurement region: obtaining the fifth point cloud data with respect to an overlapping region of the fifth measurement region which overlaps the first measurement region and the fourth measurement region by interpolating the first point cloud data and the fourth point cloud data of the overlapping region: obtaining the fifth point cloud data with respect to a region of the fifth measurement region which is included only to the first measurement region by using the first point cloud data of the region as it is: obtaining the fifth point cloud data with respect to a region of the fifth measurement region which is included only to the fourth measurement region by using the fourth point cloud data of the region as it is; and obtaining the fifth point cloud data with respect to a region of the fifth measurement region which is not included to both the first measurement region and the fourth measurement region by extrapolating the first point cloud data and the fourth point cloud data of a periphery of the region.

According to various embodiments, the detecting and classifying an object from the preprocessed image data may include: detecting and classifying an object from the image data which has been preprocessed by applying a machine learning method, and providing image information with respect to obstacles including a dump bed shape of a dump truck, a human being, and a vehicle as training data to train an artificial intelligence performing the machine learning.

According to various embodiments, a construction machine may sense a surrounding environment based on the above-described sensor fusion system.

According to various embodiments, a computer program may perform an operation according to any one method among the above-described methods, when executed by a processor.

According to various embodiments, a computer-readable storage medium may store thereon a computer program to execute an operation according to any one method among the above-described methods, when executed by a processor.

As described above, the sensor fusion system proposed by the present disclosure may increase the accuracy of the obstacle detection since the sensor fusion system may increase the accuracy of the object detection, and may dramatically increase a resolution during terrain detection, thereby making the autonomous operation of the construction machine having the sensor fusion system possible.

The operation method of the construction machine 300 or the operation of the sensor fusion system according to the embodiments of the present disclosure may be stored in a computer-readable storage medium, and may be implemented by commands that can be executed by at least one processor (e.g., processor 310).

The storage medium can comprise a database, including distributed, such as a relational database, a non-relational database, an in-memory database, or other suitable databases, which can store data and allow access to such data via a storage controller, whether directly and/or indirectly, whether in a raw state, a formatted state, an organized stated, or any other accessible state. In addition, the storage medium can comprise any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

Although the present invention has been described with reference to exemplary embodiments shown in drawings, but these are only exemplary, and it will be appreciated by those skilled in the art that various modifications and other equivalent embodiments may be made. Accordingly, the true technical protection scope of the present invention needs to be determined by the technical concept defined in the appended claims.

The invention claimed is:

1. A sensor fusion system, comprising:

a stereo camera having two lenses and configured to generate image data and a first point cloud data by capturing a three-dimensional image;

two lidar sensors configured to generate a second point cloud data and a third point cloud data, respectively; and at least one processor configured to detect object information and a point cloud data with respect to surroundings based on the image data, the first point cloud data, the second point cloud data, and the third point cloud data obtained from the stereo camera and the two lidar sensors, wherein the stereo camera generates the image data and the first point cloud data with respect to a first measurement region, wherein among the two lidar sensors, a first lidar sensor generates the second point cloud data with respect to a second measurement region by sensing the second measurement region directed upward by a first predetermined angle based on a horizontal surface, and wherein a second lidar sensor generates the third point cloud data with respect to a third measurement region by sensing the third measurement region directed downward by a second predetermined angle based on the horizontal surface.

2. The sensor fusion system of claim 1, wherein the at least one processor is configured to:

convert the first point cloud data, the second point cloud data, and the third point cloud data, each of which having a different coordinate system, into data of one unified coordinate system, obtain a fourth point cloud data with respect to a fourth measurement region formed by integrating the second measurement region and the third measurement region by integrating the converted second point cloud data and the third point cloud data, obtain a fifth point cloud data with respect to a fifth measurement region including the first measurement region and the fourth measurement region by integrating the converted first point cloud data and the fourth point cloud data, and obtain a sixth point cloud data having uniform spacing and density by performing gridding at the uniform spacing meet to a grid required by a construction machine with respect to the fifth measurement region to process the fifth point cloud data.

3. The sensor fusion system of claim 2, wherein the at least one processor is configured to obtain the fourth point cloud data by interpolating the second point cloud data and the third point cloud data in an overlapping region among the second measurement region and the third measurement region.

4. The sensor fusion system of claim 3, wherein the at least one processor is configured to:

set the fifth measurement region having a rectangular shape based on the first measurement region and the fourth measurement region, obtain the fifth point cloud data with respect to an overlapping region of the fifth measurement region which overlaps the first measurement region and the fourth measurement region by interpolating the first point cloud data and the fourth point cloud data of the overlapping region, obtain the fifth point cloud data with respect to a region of the fifth measurement region which is included only to the first measurement region by using the first point cloud data of the region, obtain the fifth point cloud data with respect to a region of the fifth measurement region which is included only to the fourth measurement region by using the fourth point cloud data of the region, and obtain the fifth point cloud data with respect to a region of the fifth measurement region which is not included to both the first measurement region and the fourth measurement region by extrapolating the first point cloud data and the fourth point cloud data of a periphery of the region.

5. The sensor fusion system of claim 4, wherein the extrapolation is performed by applying a machine learning method.

6. The sensor fusion system of claim 1, wherein the at least one processor is configured to: preprocess the image data, detect and classify an object from the preprocessed image data, and obtain a location coordinate and distance information with respect to the detected object by using a sixth point cloud data which have been obtained based on the image data, the first point cloud data, the second point cloud data, and the third point cloud data which have been obtained from the stereo camera and the two lidar sensors.

7. The sensor fusion system of claim 6, wherein the at least one processor is configured to:

detect and classify an object from the image data which has been preprocessed by applying a machine learning method, and provide image information of obstacles including a dump bed shape of a dump truck, a human being, and a vehicle as training data to train an artificial intelligence performing the machine learning.

8. A sensing method for detecting an object and generating a point cloud data with respect to a measurement region of a sensor fusion system having a stereo camera outputting an image data and a first point cloud data, and two lidar sensors outputting a second point cloud data and a third point cloud data, comprising:

obtaining the image data, the first point cloud data, the second point cloud data, and the third point cloud data;

obtaining a sixth point cloud data with respect to the measurement region based on the first point cloud data, the second point cloud data, and the third point cloud data;

preprocessing the image data;

detecting and classifying an object from the preprocessed image data; and obtaining a location coordinate and distance information of the detected object by using the sixth point cloud data, wherein the image data and the first point cloud data are obtained with respect to a first measurement region, wherein the second point cloud data is obtained by sensing, with a first lidar sensor, a second measurement region directed upward by a first predetermined angle based on a horizontal surface, and wherein the third point cloud data is obtained by sensing, with a second lidar sensor, a third measurement region directed downward by a second predetermined measurement region based on the horizontal surface.

9. The sensing method of claim 8, wherein the obtaining a sixth point cloud data with respect to the measurement region comprises:

converting the first point cloud data, the second point cloud data, and the third point cloud data, each of which having a different coordinate system, into data of one unified coordinate system;

obtaining a fourth point cloud data with respect to a fourth measurement region formed by integrating the second measurement region and the third measurement region, by integrating the converted second point cloud data and the third point cloud data;

obtaining a fifth point cloud data with respect to a fifth measurement region including the first measurement region and the fourth measurement region by integrating the converted first point cloud data and the fourth point cloud data; and obtaining a sixth point cloud data having uniform spacing and density by performing gridding at the uniform spacing meet to a grid required by a construction machine with respect to the fifth measurement region to process the fifth point cloud data.

10. The sensing method of claim 9, wherein the obtaining the fourth point cloud data comprises:

obtaining the fourth point cloud data by interpolating the second point cloud data and the third point cloud data in an overlapping region among the second measurement region and the third measurement region.

11. The sensing method of claim 10, wherein the obtaining the fifth point cloud data comprises:

setting the fifth measurement region having a rectangular shape based on the first measurement region and the fourth measurement region;

obtaining the fifth point cloud data with respect to an overlapping region of the fifth measurement region which overlaps the first measurement region and the fourth measurement region by interpolating the first point cloud data and the fourth point cloud data of the overlapping region;

obtaining the fifth point cloud data with respect to a region of the fifth measurement region which is included only to the first measurement region by using the first point cloud data of the region;

obtaining the fifth point cloud data with respect to a region of the fifth measurement region which is included only to the fourth measurement region by using the fourth point cloud data of the region; and obtaining the fifth point cloud data with respect to a region of the fifth measurement region which is not included to both the first measurement region and the fourth measurement region by extrapolating the first point cloud data and the fourth point cloud data of a periphery of the region.

12. The sensing method of claim 11, wherein the extrapolation is performed by applying a machine learning method.

13. The sensing method of claim 8, wherein the detecting and classifying an object from the preprocessed image data comprises:

detecting and classifying an object from the image data which has been preprocessed by applying a machine learning method, and providing image information of obstacles including a dump bed shape of a dump truck, a human being, and a vehicle as training data to train an artificial intelligence performing the machine learning.

14. A non-transitory computer-readable storage medium having stored thereon a computer program to execute an operation according to a method of claim 8, when executed by a processor.

\* \* \* \* \*